United States Patent
Manicke et al.

(10) Patent No.: US 11,801,568 B2
(45) Date of Patent: Oct. 31, 2023

(54) METHOD FOR WELDING TOGETHER TWO COMPONENTS, PREFERABLY OF AN EXHAUST SYSTEM OF AN INTERNAL COMBUSTION ENGINE, BY RESISTANCE WELDING

(71) Applicant: Purem GmbH, Neunkirchen (DE)

(72) Inventors: Daniel Manicke, Dresden (DE); Andreas Sauer, Eislingen (DE); Jan Pallmann, Zweibrücken (DE)

(73) Assignee: PUREM GmbH, Neunkirchen (DE)

( * ) Notice: Subject to any disclaimer, the term of this patent is extended or adjusted under 35 U.S.C. 154(b) by 548 days.

(21) Appl. No.: 15/668,155

(22) Filed: Aug. 3, 2017

(65) Prior Publication Data
US 2018/0036827 A1    Feb. 8, 2018

(30) Foreign Application Priority Data

Aug. 5, 2016   (DE) ..................... 10 2016 114 556.4

(51) Int. Cl.
| | | |
|---|---|---|
| *B23K 11/00* | (2006.01) | |
| *B23K 11/02* | (2006.01) | |
| *B23K 11/11* | (2006.01) | |

(Continued)

(52) U.S. Cl.
CPC ............ *B23K 11/02* (2013.01); *B23K 11/093* (2013.01); *B23K 11/115* (2013.01); *B23K 11/34* (2013.01);

(Continued)

(58) Field of Classification Search
CPC ....... B23K 11/02; B23K 11/115; B23K 11/34; B23K 11/093; B23K 2101/006; F01N 13/008; F01N 13/1838; F16B 37/061

(Continued)

(56) References Cited

U.S. PATENT DOCUMENTS 6,102,604 A  *  8/2000  Maughan ............ F16C 11/0628
                                                403/134
7,481,595 B2 *  1/2009  Urbach ................. B60G 7/005
                                                280/93.511

(Continued)

FOREIGN PATENT DOCUMENTS

DE    10 2006 052 032 A1    5/2008
DE    10 2014 109 018 A1    12/2015

(Continued)

*Primary Examiner* — Helena Kosanovic
*Assistant Examiner* — Ahmad Abdel-Rahman
(74) *Attorney, Agent, or Firm* — McGlew and Tuttle, P.C.

(57) ABSTRACT

A method welds together two components of an internal combustion engine exhaust system, by resistance welding, to provide greater positioning freedom of two components welded together. A first component is provided with a welding area including an insertion opening edge surrounding an insertion opening. A second component is provided with a welding area including an insertion area to be inserted into the insertion opening. The insertion area is inserted into the insertion opening such that the insertion area is in contact with the first the entire insertion opening edge. An electrical voltage is applied to resistance weld the first component to the second component. The surface (28) of the insertion area is curved about two axes that are not parallel or is curved about an axis that is parallel to the surface of the insertion area, or/and an insertion surface of the insertion opening edge is located in one plane.

20 Claims, 4 Drawing Sheets

(51) Int. Cl.
  *F01N 13/18* (2010.01)
  *B23K 11/093* (2006.01)
  *B23K 11/34* (2006.01)
  *F01N 13/00* (2010.01)
  *B23K 101/00* (2006.01)
  *F16B 37/06* (2006.01)

(52) U.S. Cl.
  CPC ....... *F01N 13/008* (2013.01); *F01N 13/1838* (2013.01); *B23K 2101/006* (2018.08); *F01N 13/1855* (2013.01); *F01N 2450/22* (2013.01); *F16B 37/061* (2013.01)

(58) Field of Classification Search
  USPC ......................................................... 219/117
  See application file for complete search history.

(56) References Cited

U.S. PATENT DOCUMENTS

| | | | |
|---|---|---|---|
| 8,256,980 B2* | 9/2012 | Walter | F16C 11/0695 403/135 |
| 2006/0016788 A1 | 1/2006 | Suhre et al. | |
| 2016/0076429 A1* | 3/2016 | Harrington | F01N 3/2066 248/201 |
| 2017/0129040 A1* | 5/2017 | Eulerich | F16C 11/0623 |

FOREIGN PATENT DOCUMENTS

| | | |
|---|---|---|
| DE | 10 2015 216 013 A1 | 2/2017 |
| EP | 1918057 A1 | 5/2008 |

* cited by examiner

METHOD FOR WELDING TOGETHER TWO COMPONENTS, PREFERABLY OF AN EXHAUST SYSTEM OF AN INTERNAL COMBUSTION ENGINE, BY RESISTANCE WELDING

CROSS REFERENCE TO RELATED APPLICATIONS

This application claims the benefit of priority under 35 U.S.C. § 119 of German Application DE 10 2016 114 556.4 filed Aug. 5, 2016, the entire contents of which are incorporated herein by reference.

FIELD OF THE INVENTION

The present invention pertains to a method for welding together two components, preferably of an exhaust system of an internal combustion engine, by resistance welding.

BACKGROUND OF THE INVENTION

A method with which a bushing can be fixed to a wall of an exhaust system component by resistance welding is known from a subsequently published German patent application DE 10 2015 216 013. The exhaust system component may be, for example, a catalytic converter, to the housing of which a bushing is to be fixed by welding for receiving a measuring probe, for example, a temperature sensor.

An opening, through which access can be gained to the interior of the housing, is provided in the wall. A surface, which provides a welding area of the bushing, can be brought into contact with a wall area of the housing, which wall area is bent outwardly, surrounds the opening and provides a welding area of the housing, is provided on the bushing, wherein said surface can be fixed to the wall area by resistance welding. A longitudinal axis of the bushing may be bent at an angle in relation to a plane in which the surface providing the welding area is located, i.e., it may not be oriented at right angles thereto, so that a measuring probe to be fixed to the bushing can be fixed in a correspondingly sloped position on the housing. The slope of the measuring probe in relation to the housing is determined by the angle between the longitudinal axis of the bushing and the plane in which the surface providing the welding area of the bushing is located.

In an alternative embodiment, the surface providing the welding area of the bushing has a conical or frustoconical configuration, so that a part of the bushing that has this surface and provides the welding area of the bushing at least slightly protrudes into and is inserted into the opening when the frustoconical surface provided thereon is in contact with the area of the housing wall, which area is bent outwardly. A longitudinal axis of the bushing is oriented parallel to an axis of the opening provided in the wall of the housing in this embodiment.

SUMMARY OF THE INVENTION

An object of the present invention is to provide a method for welding together two components, preferably of an exhaust system of an internal combustion engine, by resistance welding, in which there is a greater freedom in positioning the two components to be welded together in relation to one another.

This object is accomplished according to the present invention by a method for welding together two components, preferably of an exhaust system of an internal combustion engine, by resistance welding, comprising the actions of a) providing a first component with an insertion opening, wherein the insertion opening is surrounded by an insertion opening edge providing a welding area of the first component, b) providing a second component with an insertion area to be inserted into the insertion opening of the first component, wherein a surface of the insertion area (insertion area surface) provides a welding area of the second component, c) inserting the insertion area into the insertion opening such that surface of the insertion area is in contact with the first component essentially along the entire insertion opening edge, and d) applying an electrical voltage to the two components for the resistance welding of the first component to the second component. The surface of the insertion area is curved about two axes, which are not parallel to one another, or is curved about an axis that is parallel to the surface of the insertion area, and/or an insertion surface of the insertion opening edge is not located in one plane.

It is made possible by the embodiment in space of the areas of the two components, which are to be welded together, that these can be arranged in different positions in relation to one another, but there is a contact between the two components essentially along the entire insertion opening edge, so that the electrical current leading to the melting of the components can flow in this contact area during the resistance welding, and sufficient heating and hence melting and welding together of the two components can also be achieved in areas in which contact is interrupted, in which a small intermediate space is present between the welding areas of the two components.

It should be pointed out in this connection that the two components are in contact with one another in their welding areas essentially along the entire insertion opening edge when the two components are in contact with one another over at least half and preferably at least 80% of the length of the insertion opening edge.

It is proposed in one embodiment that is especially advantageous in respect to the selectable positioning of the two components in relation to one another that the surface of the insertion area be spherical in at least some areas or have the shape of ellipsoid or of a rotation ellipsoid. It is possible now to move the two components towards one another and to bring them into the desired position in the manner of a ball joint connection in relation to one another, but a contact between the two components is nevertheless maintained or set over an essential part of the overall length of the insertion opening edge.

Provisions may be made in an alternative embodiment for the surface of the insertion area to be, in at least some areas, a cylindrical surface, preferably a regular cylindrical surface. This also makes it possible to weld together the components in relation to one another and to position them in positions pivoted differently in relation to one another.

It is proposed in a procedure that is especially advantageous in terms of easy embodiment and also the efficient performance of the welding operation that the insertion opening be provided in action a) by preparing an essentially cylindrical recess in the first component, or/and by inserting the insertion area into the insertion opening in action c) such that the surface of the insertion area is in contact with an insertion surface of the insertion opening edge.

As an alternative, provisions may be made, especially for providing a very stable welded connection, for the insertion opening to be provided in action a) with an edge surface of the insertion opening edge, which edge surface is adapted to the shape of the surface of the insertion area, or/and for the insertion area to be inserted into the insertion opening in action c) such that the surface of the insertion area is in contact with an edge surface of the insertion opening edge.

The insertion opening may be provided, for example, by removing material, preferably by drilling, cutting, or milling. As an alternative, the insertion opening may be provided by providing a preferably cylindrical attachment on the first component, preferably by shaping of the first component. Such an attachment may be provided, for example, by the shaping of a wall area of the first component, which wall area surrounds an opening, or by attaching a separate component providing the attachment, for example, by welding.

Provisions may be made in one embodiment that is especially advantageous in terms of providing a freedom in position the two components in relation to one another for an insertion surface of the insertion opening edge to be located essentially in one plane.

The first component may have a tubular configuration with an essentially cylindrical outer circumferential contour in an alternative embodiment, wherein an insertion surface of the insertion opening edge is located essentially on a cylindrical surface. It should be pointed out here that the tabularly configured component may be configured with different cross-sectional geometries, for example, with a circular, oval or elliptical geometry, but with an essentially cylindrical contour, i.e., with a contour that does not consequently change essentially in the direction of a longitudinal axis of the tube.

It is proposed, especially if the second component is a bushing for receiving a measuring probe or the like, that the second component extend in the direction of a longitudinal axis of the component and have the insertion area in an end area. This does not necessarily mean that the second component has a larger dimension in this extension direction than, e.g., the diameter of the second component. The longitudinal axis of the second component is, in the sense of the present invention, a reference line expressing a certain extent of symmetry.

To make it possible to position, for example, a measuring probe in a sloped position in relation to a housing of a catalytic converter, it is proposed that the second component be inserted into the insertion opening in action c) such that the longitudinal axis of the component is not parallel to an axis of the insertion opening.

A precise positioning of the two components to be welded together can be achieved in the method according to the present invention without compromising the quality of the resistance-welded connection to be established by the welding area of the first component or/and the welding area of the second component are provided essentially without projections, i.e., the projection-like elevations generally provided in resistance projection welding.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
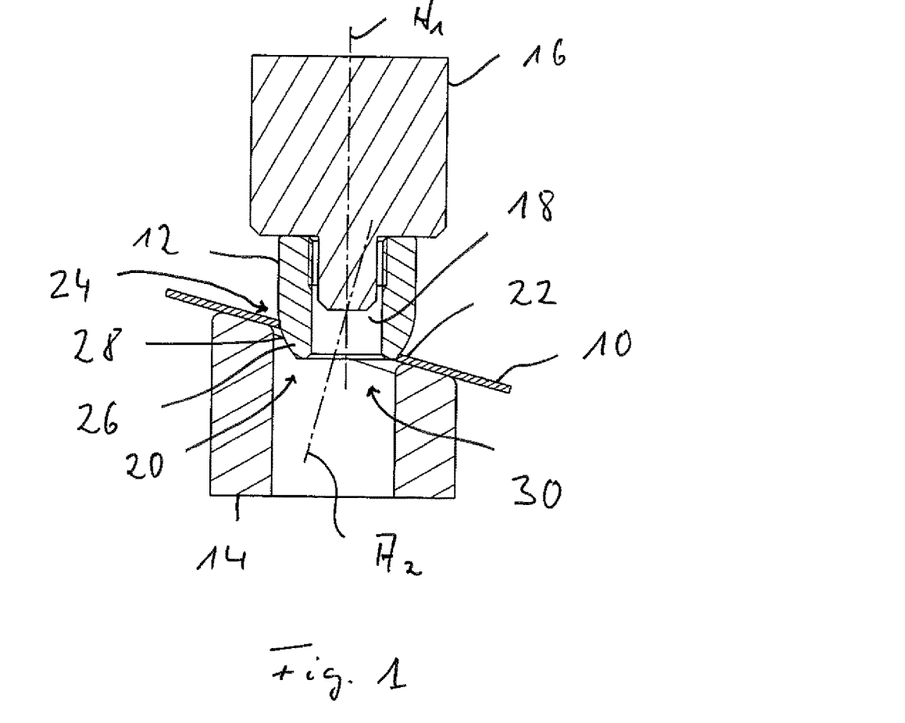
FIG. 1 is a sectional view of two components to be welded together, which are in contact with resistance welding electrodes.

Referring to the drawings, FIG. 1 shows two components 10, 12 to be welded together by resistance welding with the respective welding electrodes 14, 16 that are in contact with them. The first component 10 in FIG. 1 is an essentially plate-like or flat component. The first component 10 may be, for example, a housing or an area of a housing of an exhaust gas treatment device, e.g., a catalytic converter. The second component 12 is a connection piece, which is to be fixed to the housing or the first component 10 in the example shown in FIG. 1. The second component 12 configured as a connection piece has an opening 18, which is configured, for example, with an internal thread and into which a measuring probe or the like can be screwed. The welding electrode 16 can be inserted into the opening 18 with a complementarily shaped attachment during the resistance welding operation.

Figure 3:
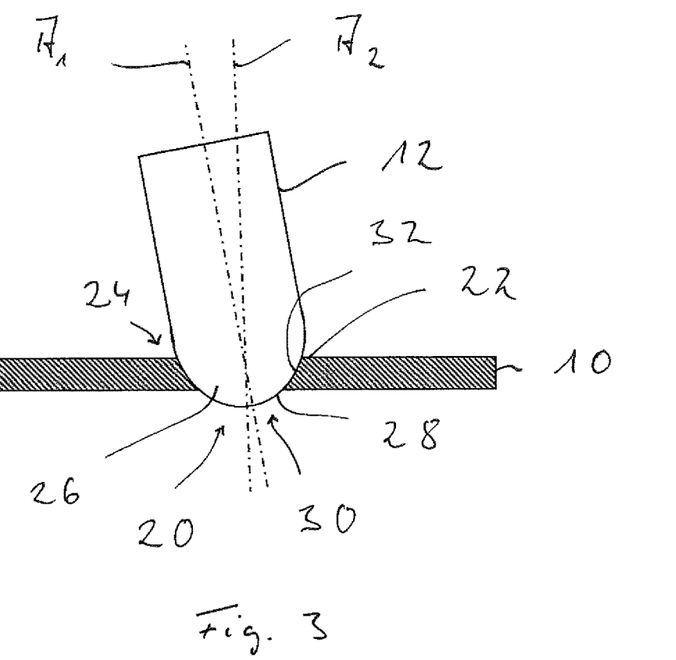
FIG. 3 is a sectional view of two components to be welded in flat contact.

As is shown in more detail in FIG. 3, the two components 10, 12 are connected to one another such that a longitudinal axis $A_1$ of the second component 12 or connection piece extending, e.g., along in the direction of this axis extends at an acute angle, i.e., not parallel, in relation to an axis $A_2$ of an insertion opening 20 formed in the first component 10. An edge area 22 surrounding the insertion opening 20 on the first component 10 forms a welding area 24 of the first component 10, on which a welding area 30 of the second component 12, which said welding area 30 is to be provided in the area of a surface 28 of the insertion area, is to be fixed.

Figure 2:
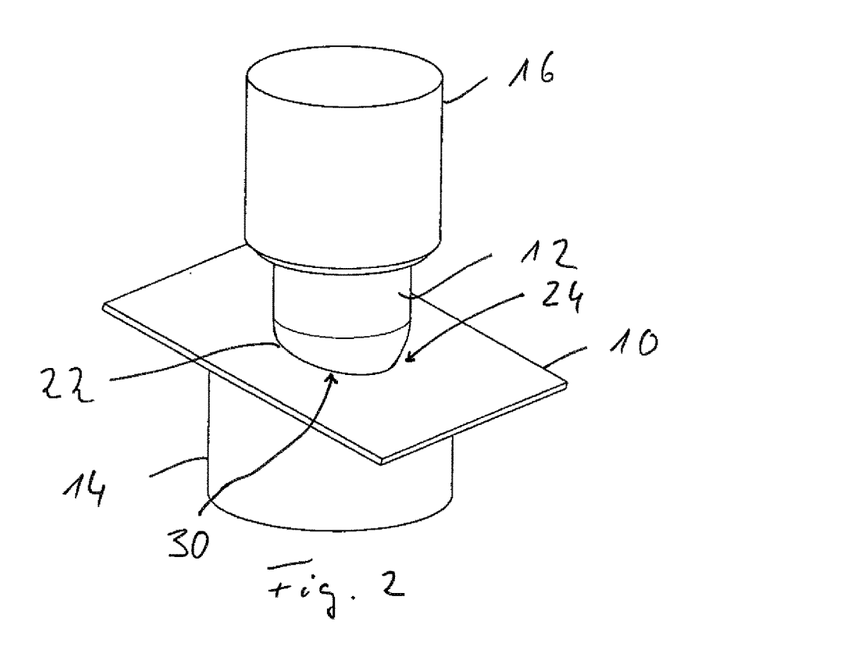
FIG. 2 is a perspective view showing the device according to FIG. 1.

In the exemplary embodiment shown in FIGS. 1 through 3, the second component 12 has an essentially rotationally symmetrical configuration especially in its insertion area 26 or the surface 28 of the insertion area provided there in relation to the longitudinal axis $A_1$, and the surface 28 of the insertion area is configured, in particular, in this exemplary embodiment with an essentially convex, spherical shape, which means that the surface of the insertion area is curved about two axes, which are, for example, mutually at right angles to one another.

Corresponding to this spherical or curved shape of the surface 28 of the insertion area, the first component 10 may also be curved spherically, but concavely in the area of the insertion opening edge 22 or of an edge surface 32, which directly encloses the insertion opening 20 and faces same. Thus, there is an essentially flat contact between the surface 28 of the insertion area and the edge surface 32 during the insertion of the insertion area 26 into the insertion opening 20. The two components 10, 12 are thus in connection with one another due to the contact of two surfaces having complementary spherical shapes in the manner of a ball joint, so that, without loss of the mutual contact, the second component 12 can be pivoted in relation to the first component 10. This makes it possible to position the longitudinal axis $A_1$ in a sloped manner in relation to the axis $A_2$ of the insertion opening 20, but also to arrange it parallel thereto if necessary. There is, in principle, a freedom in selecting the positioning of the second component 12 in relation to the first component 10.

When connecting the components 10, 12 to one another by a resistance welding method, the two components 10, 12 are arranged in the position intended for the fitting together in relation to one another, e.g., after the two components 10, 12 have been brought into contact with the respective welding electrodes 14, 16 associated with them, for example, in the manner shown in FIG. 1. The surface 28 of the insertion area is ideally in contact with the edge surface 32 over the entire circumference of the insertion opening 20 or of the edge area 22. Based on possibly unavoidable manufacturing tolerances, there may be areas in which a small gap-like intermediate space is present between the two surfaces 28, 32.

To carry out the welding operation, a voltage is applied to the two welding electrodes 14, 16, so that the two components 10, 12 melt locally and are thus welded together on their surface areas that are in contact with one another based on the electrical current now flowing and the heating of the two components 10, 12, which now occurs. Since the contact is present between the two components 10, 12 essentially over the entire circumference of the insertion opening edge 22, the components will essentially also be welded together in the area of the surfaces 28, 32 that are in contact with one another. Based on the heating of the material of which the two components 10, 12 consist, this material is also melted and forms a welded connection even where small gap-like intermediate spaces are present, so that this welded connection is formed such that it extends without interruptions about the axis $A_2$ of the insertion opening 20 and a gas-tight, stable welded connection is also formed, in particular. The provision of projection-like elevations on at least one of the two components to be welded together, as this is generally the case in so-called resistance projection welding, is not necessary for obtaining an uninterrupted, gas-tight welded connection in the procedure according to the present invention.

The insertion opening 20 may be prepared, for example, by a spherical cutter in the first component 10 in the embodiment of the component 10 shown in FIG. 3. The radius of curvature of the spherical cutter is duplicated on the edge surface 32 of the insertion opening edge 22 and is selected essentially such that it corresponds to the radius of curvature of the surface 28 of the insertion area.

Figure 4:
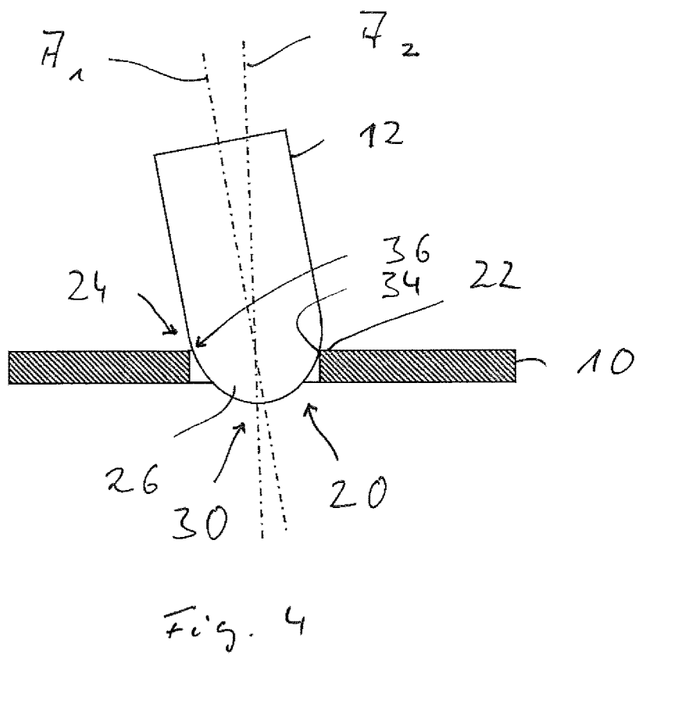
FIG. 4 is a sectional view of two components to be welded together in linear contact.

In an alternative embodiment shown in FIG. 4, the insertion opening 20 is provided as an essentially cylindrically configured opening in the first component 10. This insertion opening 20 may be formed, for example, by drilling, cutting, punching or the like. Based on the cylindrical configuration of the insertion opening 20, i.e., the edge surface 32 is consequently essentially a cylindrical surface, for example, with a circular contour, there is essentially no flat contact between the second component 12, which is inserted with its insertion area 26 into the insertion opening 20 at least slightly, and the first component 10. The second component 12 with second component surface 28 of the insertion area is rather in contact with an insertion surface 34 of the edge area 22. It should be pointed out that the insertion opening 20 has, in principle, two such surfaces, and the insertion surface 34, which is also shown in FIG. 4, is the surface with which the insertion area 26 can come into contact.

The insertion area 26 is provided with an, e.g., spherical surface 28 of the insertion area, i.e., with a surface that is curved about two axes that are, for example, at right angles to one another, in the exemplary embodiment shown in FIG. 4 as well, and the radius of curvature is equal in all surface areas because of the spherical shape. If the insertion opening 20 is provided with a circular contour, there is ideally an essentially linear contact between the surface 28 of the insertion area and the insertion surface 34, which contact extends about the axis $A_2$ of the insertion opening 20 without interruptions. However, as is shown on the left-hand side of the insertion opening 20, a small gap-like intermediate space 36 may develop between the surface 28 of the insertion area and the insertion surface 34 in some circumferential areas, for example, due to manufacturing tolerances. As was already explained above with reference to FIG. 3, the material of the two components 10, 12 will also be melted in these areas and thus connected to one another by welding based on the short distance and the generally comparatively small circumferential extension of such gap-like intermediate spaces 36 when the voltage necessary for the welding is applied and the welding current flows.

Figure 5:
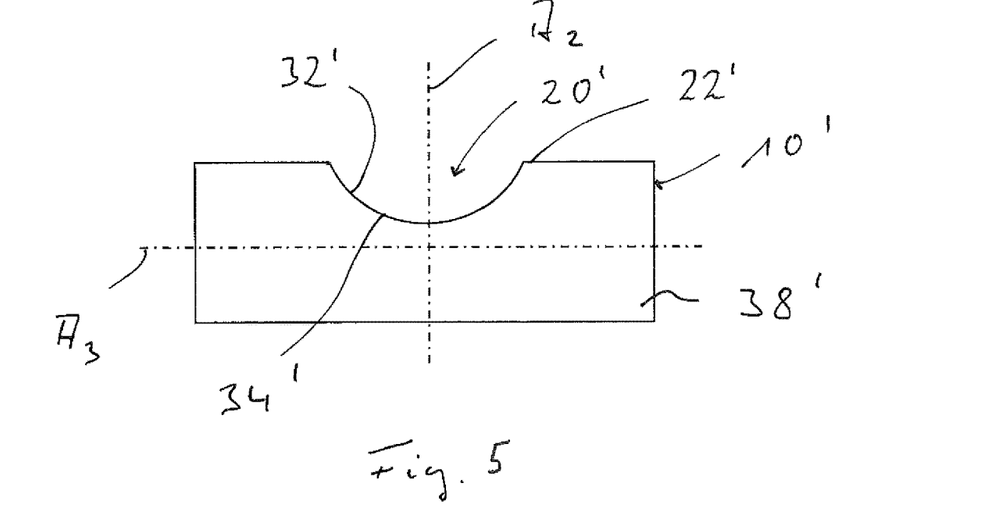
FIG. 5 is a lateral view of a tubular component configured with an insertion opening.
Figure 6:
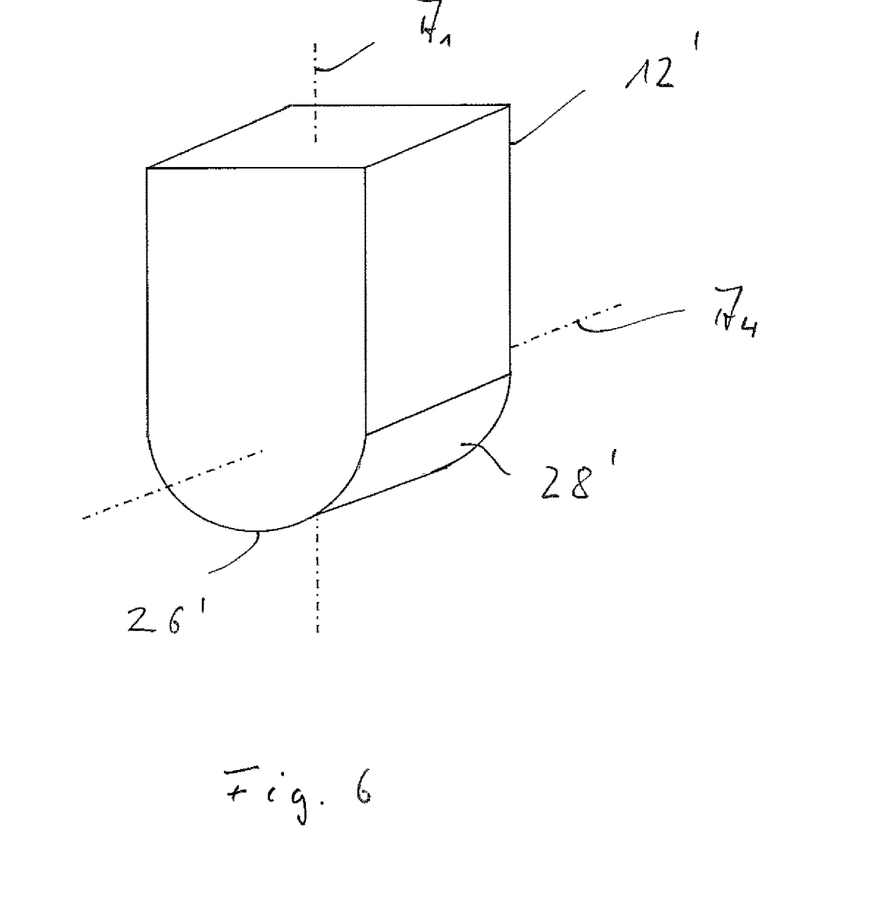
FIG. 6 is a component to be welded to the component according to FIG. 5.

FIGS. 5 and 6 show an alternative embodiment of two components 10', 12' to be connected to one another. The component 10' may be, for example, a tube extending in the direction of a longitudinal axis $A_3$, i.e., it may have an essentially cylindrical shape, for example, with a round cross-sectional geometry. The insertion opening 20' may be prepared in the first component 10', for example, by means of a solid cylindrical milling cutter. This insertion opening has an axis $A_2$ extending essentially at right angles to the longitudinal axis $A_3$ of the first component 10'. Thus, the edge area 22' of the opening 20' or the insertion surface 34' as well as the edge surface 32' are not in one plane, unlike in the exemplary embodiment according to FIGS. 1 through 4, but, due to the curved configuration of the first component 10', they are likewise curved. In particular, the insertion surface 34' lies on the cylindrical outer circumferential surface 38' of the first component 10'.

In association with this shape of the edge area 22', which shape extends about the axis $A_2$ in a ring-like manner and is curved in the direction of the axis $A_2$ of the insertion opening 20', the second component 12' has a complementarily shaped surface 28' of the insertion area, which is curved, for example, complementarily to the curvature of the edge area 22', for example, it is also curved in a circular manner. The surface 28' of the insertion area is curved in this exemplary embodiment about a single axis $A_4$, for example, with an essentially constant radius of curvature, this axis $A_4$ being parallel to the surface of the insertion area rather than intersecting the surface of the insertion area.

The second component 12' can be inserted into the insertion opening 20' with the insertion area 26' thus formed, so that the essentially cylindrical surface 28' of the insertion area, which is curved, for example, in a circular manner, comes into contact with the correspondingly curved edge area 22'. Depending on how the insertion opening 20' was prepared, an essentially linear contact develops with the insertion surface 34' or a flat contact develops on the edge surface 32' at least locally.

In this embodiment as well, the two components 10', 12' can be positioned by pivoting the second component 12' about the axis $A_4$ such that an angle will develop, if necessary, between the two axes $A_1$ and $A_2$, i.e., the second component extending essentially in the direction of the longitudinal axis $A_1$ is not consequently necessarily arranged at right angles to the longitudinal axis $A_3$ of the first component 10' and thus it must be connected to the first component 10'. Consequently, there is a freedom in positioning the second component 12' in relation to the first component 10' in this case as well.

Figure 7:
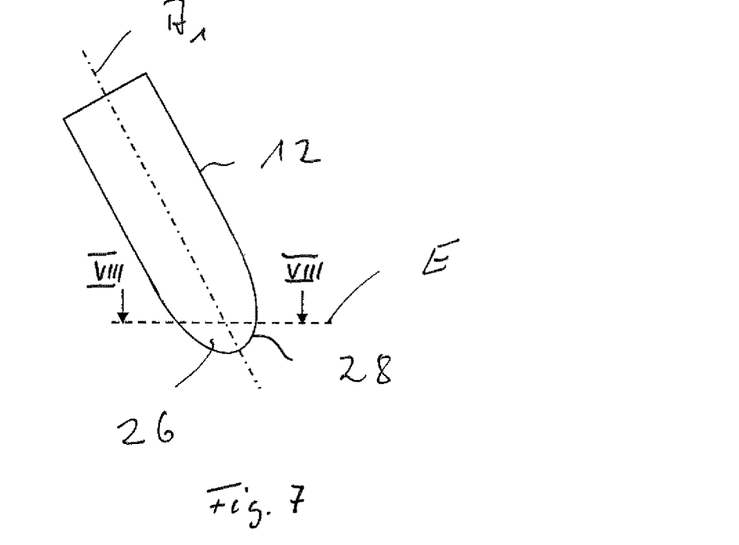
FIG. 7 is a lateral view of a component with an elliptical cross section.
Figure 8:
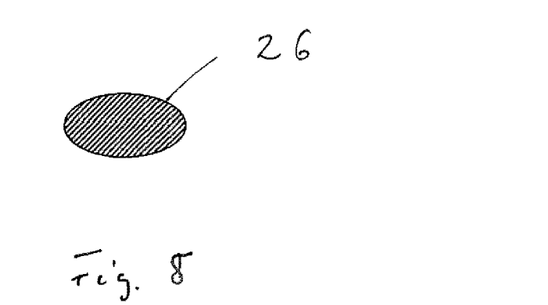
FIG. 8 is a sectional view showing the component of FIG. 7, cut along a line VIII-VIII in FIG. 7.
Figure 9:
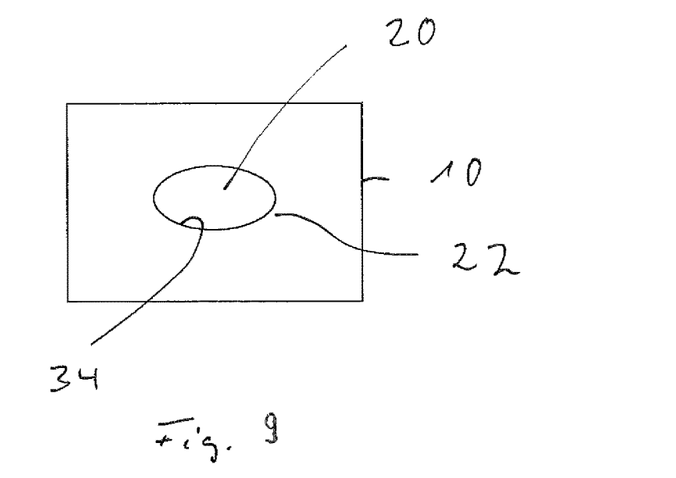
FIG. 9 is a view of a component with an insertion opening, which component is to be welded to the component of FIG. 7.

Another embodiment is shown in FIGS. 7 through 9. This corresponds in terms of the basic configuration of the two components 10, 12 to the embodiment described with reference to FIGS. 1 through 4. The first component 10 may consequently have an essentially flat configuration at least in the area of the insertion opening 20, so that the insertion opening 20 or the edge area 22 thereof is also located in one plane. The second component 12 shown in a lateral view in FIG. 7 is configured such that it extends, for example, in the direction of the longitudinal axis $A_1$. Unlike in the embodiments according to FIGS. 1 through 4, the second component 12 is not configured, especially in the second component insertion area 26, with a surface 28 of the insertion area extending along the longitudinal axis $A_1$ in a rotationally symmetrical manner. The second component 12 could be configured, for example, with an elliptical cross-sectional geometry, at least in its insertion area 26.

If the second component 12 is cut in a plane E bent at an angle in relation to the longitudinal axis $A_1$ thereof, a circumferential contour of the cross-sectional surface, which is correspondingly also elliptical and is shown in FIG. 8, is obtained in the insertion area 26. If the second component 12 is arranged with a corresponding slope angle of the longitudinal axis $A_1$ in relation to the first component 10, a contact extending essentially completely circularly about the axis of the insertion opening 20, which axis is at right angles to the drawing plane of FIG. 9, can be obtained in the above-described manner between the two components 10, 12 if the insertion opening 20 in the first component 10 has a shape complementary to the cross-sectional geometry of the insertion area 26, which geometry is shown in FIG. 8.

This means that, according to the present invention, if the geometry of the insertion area 26 is known and the slope angle provided for the second component 12 in relation to the first component 10 is known as well, the shape of the insertion opening 20 can be selected such that the course of the insertion opening edge 22 of the circumferential contour of the second component 12 also corresponds, in second component areas, that come into contact with the first component 10 to the surface 28 of the insertion area. When the resistance welding operation is carried out, a welded connection of the two components 10, 12, which extends uninterruptedly for the entire edge area 22, can then be obtained in the above-described manner.

Since the second component 12 is nevertheless curved about two axes in the area of its surface 28 of the insertion area in this embodiment as well, even though it is curved with a radius of curvature varying over the surface 28 of the insertion area, the second component 12 can be welded in a certain range of variations in relation to the first component 10 in this embodiment as well, without a substantial loss of mutual contact being lost between these two components 10, 12. A gap-like intermediate space may now develop locally between the two components 10, 12, which, unless this gap-like intermediate space exceeds a certain extent in the circumferential direction, will nevertheless be closed due to melting of the two components 10, 12 when the welding voltage is applied to the two components 10, 12 and when welding current flows.

The above explanations show that, due to the fact that in the two components to be connected to one another, the component that has the insertion area with the curved surface of the insertion area has a surface curved about at least one axis in this insertion area, this component will always protrude slightly into the insertion opening of the other component when the contact is established. Due to this mutual meshing, it is possible to perform a pivoting at least in a small range of angles even in case of nonspherical shape of the surfaces that are in contact with one another, and nevertheless to obtain an uninterrupted course of the welded connection area when a resistance welding operation is carried out.

This manner of connecting the two components to one another can also be achieved independently from the configuration especially of the first component. As is shown in the different embodiment, this component may have a flat configuration, at least in the area in which the insertion opening is to be provided, so that the insertion edge area or an insertion surface thereof is correspondingly also in one plane. As an alternative, the first component may be curved in this area. The insertion opening on the first component may be prepared, as was mentioned above, for example, by machining, i.e., for example, drilling, milling or cutting. It is also possible, in principle, to prepare this opening by shaping of the first component as an attachment extending, for example, cylindrically in the direction of the axis of the opening. An end face of this attachment may then be configured, for example, with the edge surface geometry shown in FIG. 3 for the flat contact the surface of the insertion area of the second component.

While specific embodiments of the invention have been shown and described in detail to illustrate the application of the principles of the invention, it will be understood that the invention may be embodied otherwise without departing from such principles.

What is claimed is:

1. A method for welding together two components of an exhaust system of an internal combustion engine, by resistance welding, the method comprising the steps of:

providing a first component with an insertion opening and with an insertion opening rim surrounding the insertion opening having a rim surface starting out from an insertion opening rim edge and extending along a thickness of the first component, wherein the insertion opening rim provides a first component welding area;

providing a second component with an insertion area to be inserted into the insertion opening of the first component, wherein an insertion area surface of the insertion area provides a second component welding area, wherein the second component extends in a direction of a second component longitudinal center axis and the second component insertion area is in an axial end area of the second component in the direction of the second component longitudinal center axis;

inserting the insertion area into the insertion opening such that the second component longitudinal center axis is not parallel to an insertion opening center axis of the insertion opening and that the insertion area surface is in contact with the first component at the insertion opening rim essentially over the entire circumference of the insertion opening; and applying an electrical voltage to the first component and the second component for the resistance welding of the first component to the second component, wherein:
the insertion area surface is curved about two axes that are not parallel to one another or wherein:
the insertion area surface is curved about an axis that is parallel to the insertion area surface, or wherein:
an insertion opening edge of the insertion opening rim is not in one plane, or wherein:
the insertion area surface is curved about two axes that are not parallel to one another or the insertion area surface is curved about an axis that is parallel to the insertion area surface, and
an insertion opening edge of the insertion opening rim is not in one plane.

2. A method in accordance with claim 1, wherein the insertion area surface has a shape of a portion of a sphere or has a shape of a portion of an ellipsoid or of a portion of a rotation ellipsoid.

3. A method in accordance with claim 1, wherein the insertion area surface is a cylindrical surface in at least some areas.

4. A method in accordance with claim 1, wherein:
the step of providing the first component includes providing the insertion opening by preparing an essentially cylindrical recess in the first component; or
the step of inserting the insertion area into the insertion opening includes inserting the insertion area into the insertion opening such that a surface of the insertion area is in contact with the insertion opening edge of the insertion opening rim; or
the step of providing the first component includes providing the insertion opening by preparing an essentially cylindrical recess in the first component and the step of inserting the insertion area into the insertion opening includes inserting the insertion area into the insertion opening such that a surface of the insertion area is in contact with the insertion opening edge of the insertion opening rim.

5. A method in accordance with claim 1, wherein:
the step of providing the first component includes providing the insertion opening with the insertion opening edge of the insertion opening rim adapted to the shape of the insertion area surface; or
the step of inserting the insertion area into the insertion opening includes inserting the insertion area into the insertion opening such that the insertion area surface is in contact with the insertion opening edge of the insertion opening rim; or
the step of providing the first component includes providing the insertion opening with the insertion opening edge of the insertion opening rim adapted to the shape of the insertion area surface and the step of inserting the insertion area into the insertion opening includes inserting the insertion area into the insertion opening such that the insertion area surface is in contact with the insertion opening edge of the insertion opening rim.

6. A method in accordance with claim 1, wherein the insertion opening is prepared by removing material by drilling, cutting, or milling.

7. A method in accordance with claim 1, wherein the insertion opening is provided by providing a preferably cylindrical attachment on the first component.

8. A method in accordance with claim 1, wherein the insertion opening is provided by shaping of the first component, the first component defining one of the two components of the exhaust system, the second component defining another one of the two components of the exhaust system.

9. A method in accordance with claim 1, wherein the insertion edge surface of the insertion opening edge lies essentially in one plane.

10. A method in accordance with claim 1, wherein:
the first component has a tubular configuration with an essentially cylindrical outer circumferential contour; and
the insertion opening edge of the insertion opening rim lies essentially on a cylindrical surface.

11. A method in accordance with claim 1, wherein:
the first component welding area is provided essentially without projections; or
the second component welding area is provided essentially without projections; or
the first component welding area is provided essentially without projections and the second component welding area is provided essentially without projections.

12. A method for welding together two components of an exhaust system of an internal combustion engine, by resistance welding, the method comprising the steps of:
providing a first component comprising an insertion rim defining an insertion opening, the insertion rim having a rim surface starting out from an insertion opening rim edge and extending along a thickness of the first component, wherein the insertion rim defines a first component welding area;
providing a second component comprising an insertion end portion area to be inserted into the insertion opening of the first component, wherein an insertion area end portion surface of the insertion end portion area defines a second component welding area, wherein the second component extends in a direction of a second component longitudinal center axis and the insertion end portion area defines an axial end area of the second component;
inserting the insertion end portion area into the insertion opening such that the second component longitudinal center axis is not parallel to an insertion opening center axis of the insertion opening and that the insertion area end portion surface is in contact with the first component essentially over the entire circumference of the insertion opening; and
applying an electrical voltage to the first component and the second component for the resistance welding of the first component to the second component, wherein:
the insertion area end portion surface is curved about two axes that are not parallel to one another or wherein:
the insertion area end portion surface is curved about an axis that is parallel to the insertion area end portion surface or wherein:
an insertion edge of the insertion rim defining the insertion opening is not in one plane or wherein:
the insertion area end portion surface is curved about two axes that are not parallel to one another or the insertion area end portion surface is curved about an axis that is parallel to the insertion area end portion surface and the insertion edge of the insertion rim defining the insertion opening is not in one plane.

13. A method in accordance with claim 12, wherein the insertion area end portion surface has a shape of a portion of a sphere or has a shape of a portion of an ellipsoid or of a portion of a rotation ellipsoid.

14. A method in accordance with claim 12, wherein the insertion area end portion surface is a cylindrical surface in at least some areas.

15. A method in accordance with claim 12, wherein the first component is located adjacent to the axial end area of the second component, the first component defining one of the two components of the exhaust system, the second component defining another one of the two components of the exhaust system.

16. A method for welding together two components of an exhaust system of an internal combustion engine, by resistance welding, the method comprising the steps of:
   providing a first component comprising an insertion rim defining an insertion opening and a first component welding area, the insertion rim having a rim surface starting out from an insertion opening rim edge and extending along a thickness of the first component;
   providing a second component comprising an insertion end portion area located at an axial end area of the second component, wherein an insertion area end portion surface of the insertion area defines a second component welding area, wherein the second component extends in a direction of a second component longitudinal center axis;
   moving the second component in a direction of the first component such that at least a portion of the insertion end portion area moves into the insertion opening and the second component longitudinal center axis is not parallel to an insertion opening center axis of the insertion opening, wherein the insertion area end portion surface is in contact with the first component at the insertion rim essentially over the entire circumference of the insertion opening; and
   applying an electrical voltage to the first component and the second component for the resistance welding of the first component to the second component, wherein:
   the insertion area end portion surface is curved about two axes that are not parallel to one another or wherein:
   the insertion area end portion surface is curved about an axis that is parallel to the insertion area end portion surface or wherein:
   an insertion edge of the insertion rim defining the insertion opening is not in one plane or wherein:
   the insertion area end portion surface is curved about two axes that are not parallel to one another or the insertion area end portion surface is curved about an axis that is parallel to the insertion area end portion surface and an insertion edge of the insertion rim defining the insertion opening is not in one plane.

17. A method in accordance with claim 16, wherein the insertion area end portion surface has a shape of a portion of a sphere or has a shape of a portion of an ellipsoid or of a portion of a rotation ellipsoid.

18. A method in accordance with claim 16, wherein the insertion area end portion surface is a cylindrical surface in at least some areas.

19. A method in accordance with claim 16, wherein the insertion opening is prepared by removing material by drilling, cutting, or milling.

20. A method in accordance with claim 16, wherein the first component is located adjacent to the axial end area of the second component, each portion of the insertion area end portion surface being located radially inward of the insertion rim with respect to the second component longitudinal center axis, the first component defining one of the two components of the exhaust system, the second component defining another one of the two components of the exhaust system.

\* \* \* \* \*